United States Patent
Haque et al.

(10) Patent No.: US 9,683,365 B2
(45) Date of Patent: Jun. 20, 2017

(54) PISTON BASED SELF-CENTERING BRACE APPARATUS

(71) Applicant: The University of British Columbia, Okanagan, Kelowna, British Columbia (CA)

(72) Inventors: A. B. M. Rafiqul Haque, Kelowna (CA); M. Shahria Alam, Kelowna (CA)

(73) Assignee: THE UNIVERSITY OF BRITISH COLUMBIA, OKANAGAN, Kelowna, British Columbia (CA)

( * ) Notice: Subject to any disclaimer, the term of this patent is extended or adjusted under 35 U.S.C. 154(b) by 0 days.

(21) Appl. No.: 15/109,288

(22) PCT Filed: Dec. 31, 2014

(86) PCT No.: PCT/CA2014/051269
§ 371 (c)(1),
(2) Date: Jun. 30, 2016

(87) PCT Pub. No.: WO2015/100497
PCT Pub. Date: Jul. 9, 2015

(65) Prior Publication Data
US 2016/0326742 A1    Nov. 10, 2016

Related U.S. Application Data

(60) Provisional application No. 61/922,936, filed on Jan. 2, 2014.

(51) Int. Cl.
*E04B 1/98* (2006.01)
*E04H 9/02* (2006.01)
(Continued)

(52) U.S. Cl.
CPC ............ *E04B 1/98* (2013.01); *E04C 3/02* (2013.01); *E04H 9/02* (2013.01); *F16F 15/085* (2013.01); *E04C 2003/026* (2013.01)

(58) Field of Classification Search
CPC ..... E04B 1/98; E04C 3/02; E04C 9/02; E04C 2003/026; E04H 9/02; F16B 35/04; F16B 15/02
(Continued)

(56) References Cited

U.S. PATENT DOCUMENTS 6,826,874 B2 * 12/2004 Takeuchi ............... E04H 9/02
                                                            52/167.1
8,424,252 B2 *  4/2013 Tsai ..................... E04H 9/02
                                                            52/167.1
(Continued)

FOREIGN PATENT DOCUMENTS

JP          2005126894 A  *  5/2005

*Primary Examiner* — Beth Stephan
(74) *Attorney, Agent, or Firm* — Kevin M. Klughart; David W. Carstens; Carstens & Cahoon, LLP

(57) ABSTRACT

A brace apparatus for mounting between two structural components of a support infrastructure to absorb vibrational energy imposed on the support infrastructure. The brace apparatus comprises: (i) an elongate piston component having one end engaged with a piston plate and the other end configured for demountable pivotable engagement with a first structural component, (ii) a sleeve component for receiving the piston component therein, said sleeve component having a back cap for receiving the piston component therethrough and a front cap configured for demountable pivotable engagement with a second structural component, and (iii) a plurality of equidistantly spaced-apart tie rods housed within the sleeve component wherein one end of each tie rod is secured to the outer surface of the front cap and the other end is secured to the outer surface of the back
(Continued)

cap, the tie rod slidingly inserted through an orifice provided therefore in the piston plate.

24 Claims, 12 Drawing Sheets

(51) Int. Cl.
*F16F 15/08* (2006.01)
*E04C 3/02* (2006.01)

(58) Field of Classification Search
USPC .............................................. 52/167.3, 167.4
See application file for complete search history.

(56) References Cited

U.S. PATENT DOCUMENTS

| | | | | |
|---|---|---|---|---|
| 2008/0016794 A1* | 1/2008 | Tremblay | ................... | E04H 9/02 52/167.4 |
| 2010/0205876 A1* | 8/2010 | Christopoulus | ........... | E04H 9/02 52/167.3 |
| 2012/0266548 A1* | 10/2012 | Tremblay | ................... | E04H 9/02 52/167.3 |
| 2013/0205690 A1* | 8/2013 | Hinchman | ................ | E04H 9/02 52/167.3 |

* cited by examiner

PISTON BASED SELF-CENTERING BRACE APPARATUS

CROSS REFERENCE TO RELATED APPLICATIONS

This application is the U.S. national phase of International Application No. PCT/CA2014/051269 filed Dec. 31, 2014, which designated the U.S. and claims priority to U.S. application No. 61/922,936 filed Jan. 2, 2014, the entire content of which is hereby incorporated by reference.

TECHNICAL FIELD

This disclosure relates to brace devices and apparatus for use in construction of structures, and more particularly, to brace devices and apparatus for absorbing vibrational energies generated by earthquakes, wind, shock waves, and the like.

BACKGROUND

It is now common practice to incorporate different types of structural bracing systems into the design and construction of multiple story buildings in regions that are at risk for occurrences of earthquakes. Such bracing systems are generally integrated into the foundations of building and their upward-extending structural support infrastructure to reduce seismically induced damages that may occur during earthquake events. The most commonly used approaches include bracing systems that: (i) isolate the foundation from its upward-extending support infrastructure so that seismic energy received by the foundation is not fully transmitted to the support infrastructure, (ii) ductile structural bracing systems designed to deform under forces generated by seismic energy received by the foundation, and (iii) ductile self-centering bracing systems configured to resist seismic forces by tensile and compressive deformation.

Base-isolation systems typically use structural elements with very low stiffness to isolate the support infrastructure from its foundation. However, base-isolation systems are difficult and expensive to repair after damage from severe seismic events.

Ductile beam-column connection systems are currently the most widely practised method for designing structures against earthquake loads. However, a problem with such structural systems is that such designs allow nonlinear/plastic deformations in the beam plastic hinge region. Once permanent deformation occurs as a consequence of a seismic event, the damaged supporting components of building infrastructure and its foundation are difficult to repair and often, must be rebuilt or demolished and replaced.

A variety of bracing systems have been proposed for incorporation into building design and construction. Some examples of bracing system include (i) buckling restrained braces such as those disclosed in U.S. Pat. Nos. 6,826,874, 8,424,252, and US Patent Application Publication No. 2013/0205690, (ii) a cast structural fuse device for bracing members that flex under dynamic tension and compression such as disclosed in U.S. Pat. No. 8,683,758, (iii) self-centering energy dissipation devices such as disclosed in US Patent Application Publication No. 2012/0266548, (iv) use of novel memory alloys in self-centering seismic isolation devices (Dolce et al. 2000, *Implementation and testing of passive control devices based on shape memory alloys*. Earthquake Eng. Struct. Dyn. 29(7), 945-968; Dolce et al., 2001, *SMA Re-centering Devices for Seismic Isolation of Civil Structures*. Proc. SPIE 4330, 238-249), and (v) reusable hysteretic damping brace disclosed by Zhu et al. (2007, *Seismic behaviour of self-centring braced frame buildings with reusable hysteretic damping brace*. Earthquake Engineering & Structural Dynamics. 36:1329-1346). Buckling restrained braces and flexing fuse devices resist seismic forces by deforming into nonlinear ranges. They exhibit fat hysteresis loops which contribute to higher amount of damping and thus can reduce velocity and acceleration of the system. However, the problem with buckling restrained braces and flexing fuse devices is the neither type is capable of self-centering after the application of seismic energy ceases. The problem with the above-noted self-centering dissipation devices is that the methods required for their construction are costly and therefore, they have not been widely adopted by the construction industry.

SUMMARY

The present disclosure relates to piston-based self-centering brace apparatus for incorporation into the junctures of structural components configured into support infrastructures, for the purposes of absorbing and dissipating energies i.e., vibrational energies emanating from and generated by earthquakes, winds, shock waves resulting from explosions or impacts, and the like. The piston-based self-centering brace apparatus is mountable at one end to a first structural component or a nodal point of a support infrastructure and at its other end, to a second structural component or a nodal point. Alternatively, an exemplary piston-based self-centering brace apparatus may be fixed to a first structural component or a nodal point of a support infrastructure with one end of the brace apparatus mountable to a second structural component or a nodal point and its other end mountable to a third structural component or a nodal point. If so desired, a plurality of exemplary piston-based self-centering brace apparatus can be connected in an end-to-end configuration or alternatively, connected in a parallel configuration.

On exemplary embodiment of the present disclosure pertains to a piston-based self-centering brace apparatus for mounting between two structural components or nodal points of a support infrastructure to absorb and/or absorb tension forces and compression forces imposed on the support infrastructure by seismic energy, winds, and shock waves resulting from an explosion or from repeated impacts from volumes of water. The brace apparatus generally comprises: (i) an elongate piston component having a distal end and a proximal end, (ii) a sleeve component with a back cap for receiving and communicating with the piston component, and (iii) a plurality of equidistantly spaced-apart tie rods housed within the inner perimeter of sleeve component. The distal end of the piston component is engaged with a piston plate that slidingly communicates with the inner surfaces of the sleeve component. The proximal end of the piston component is configured to cooperate with a hinged component for demountable engagement with a first structural component. The front cap of the sleeve component is configured to cooperate with a hinged component for demountable engagement with a second structural component. Each of the plurality of tie rods has one end extending through an orifice provided in the front cap and is secured thereto, while the other end of the tie rod extends through an orifice provided therefore in the back cap and is secured thereto. Each tie rod is slidingly inserted through an orifice provided therefore in the piston plate.

Another exemplary embodiment pertains to a piston-based self-centering brace apparatus comprising (i) an elongate piston component having a distal end and a proximal end, (ii) a sleeve component with a back cap for receiving and communicating with the piston component, (iii) a first plurality of equidistantly spaced-apart tie rods housed within the inner perimeter of sleeve component between the back cap and the piston plate, and (iv) a second plurality of equidistantly spaced-apart tie rods housed within the inner perimeter of sleeve component between the piston plate and the front plate. The distal end of the piston component is engaged with a piston plate that slidingly communicates with the inner surfaces of the sleeve component. The proximal end of the piston component is configured to cooperate with a hinged component for demountable engagement with a first structural component. The front cap of the sleeve component is configured to cooperate with a hinged component for demountable engagement with a second structural component. Each of the first plurality of tie rods has one end extending through an orifice provided in the back cap and is secured thereto while its other end slidingly extends through an orifice provided therefore piston plate. Each of the second plurality of tie rods has one end extending through an orifice provided in the front cap and is secured thereto while its other end slidingly extends through an orifice provided therefore piston plate.

The exemplary piston-based self-centering brace apparatus can be used for in structural foundations and supporting infrastructures for the purposes of resisting and/or absorbing energies during a vibrational energy event, and restoring the structure to its original physical orientation and position after the vibration energy event has ceased. The exemplary piston-based self-centering brace apparatus are also useful for bracing the junctures and joints of adjacent structural components in building support infrastructures, in bridge support infrastructures, and the like for the purposes of absorbing and/or resisting tension forces and compression forces during the occurrence of a vibrational energy event, and then for restoring the physical relationship of the structure components to their original physical orientations and positions after the vibration energy event has ceased.

DESCRIPTION OF THE DRAWINGS

The present disclosure will be described in conjunction with reference to the following drawings in which.

DETAILED DESCRIPTION

The present disclosure pertains to piston-based self-centering brace apparatus for engagement with abutting and/or interconnecting structural members comprising a support infrastructure for the purposes of absorbing and dissipating tensioning and compressive energies i.e., vibrational energies emanating from and generated by earthquakes (also commonly referred to as seismic events), winds, shock waves resulting from explosions or impacts, and the like.

As used herein, the term "support infrastructure" means a substructure and/or an underlying foundation and/or a superstructure and/or a framework for an edifice such as a building or a tower, or for a bridge, an aquaduct, a dam, a weir, a wharf, a tunnel, an electrical tower, and the like.

The piston-based self-centering brace apparatus is mountable at one end to a first structural member or nodal point and at its other end, to a second structural member or nodal point. Alternatively, the sleeve component of the piston-based self-centering brace apparatus may be fixed to a first structural component or nodal point of the support infrastructure, with one end of the brace apparatus mountable to a second structural component or nodal point and its other end mountable to a third structural component or nodal point. If so desired, a plurality of exemplary piston-based self-centering brace apparatus can be connected in an end-to-end configuration or alternatively, connected in a parallel configuration.

It is contemplated that a plurality of the piston-based self-centering brace apparatus disclosed herein, will be integrated into the juncture points between multiple adjacent structural components or nodal points within a support infrastructure. During the occurrence of a vibrational energy event imposed onto the support infrastructure, the piston-based self-centering brace apparatus will function to restrain and oppose relative motions between the two or three structural components that the apparatus is mounted to, thereby dissipating the vibrational energy while minimizing residual physical deformations of the structural components. At the conclusion of the vibrational energy event, the self-centering properties of the piston-based self-centering brace apparatus disclosed herein will restore the multiple adjacent structural components to their original positions.

Figure 1:
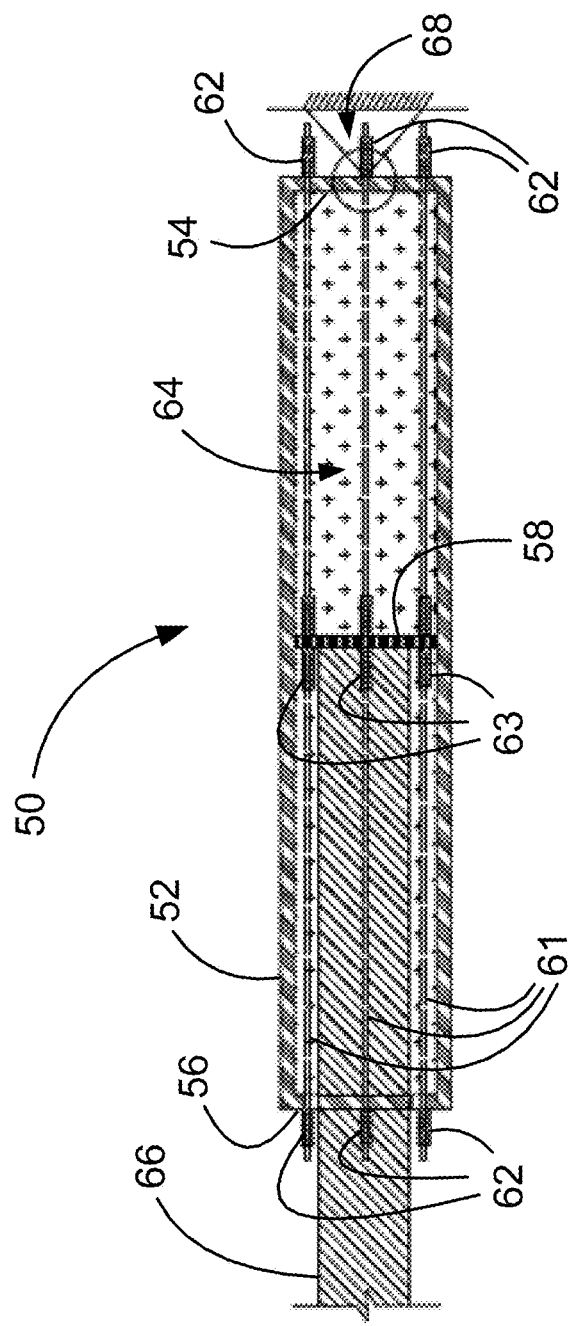
FIG. 1 is a cross-sectional view of an exemplary piston-based self-centering brace apparatus according to the present disclosure.
Figure 2:
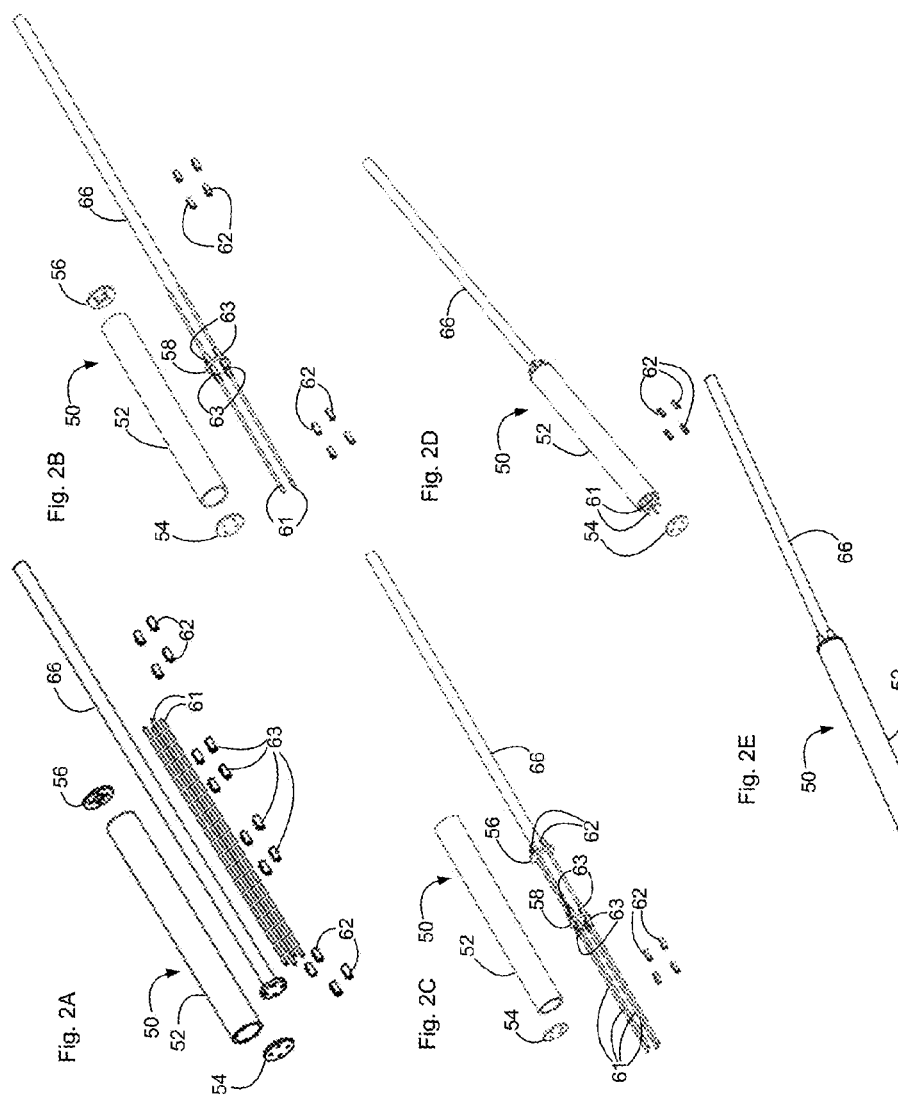
FIGS. 2(A)-2(E) are perspective views showing exemplary steps for assembly of an exemplary piston-based self-centering brace apparatus shown in FIG. 1.
Figure 3:
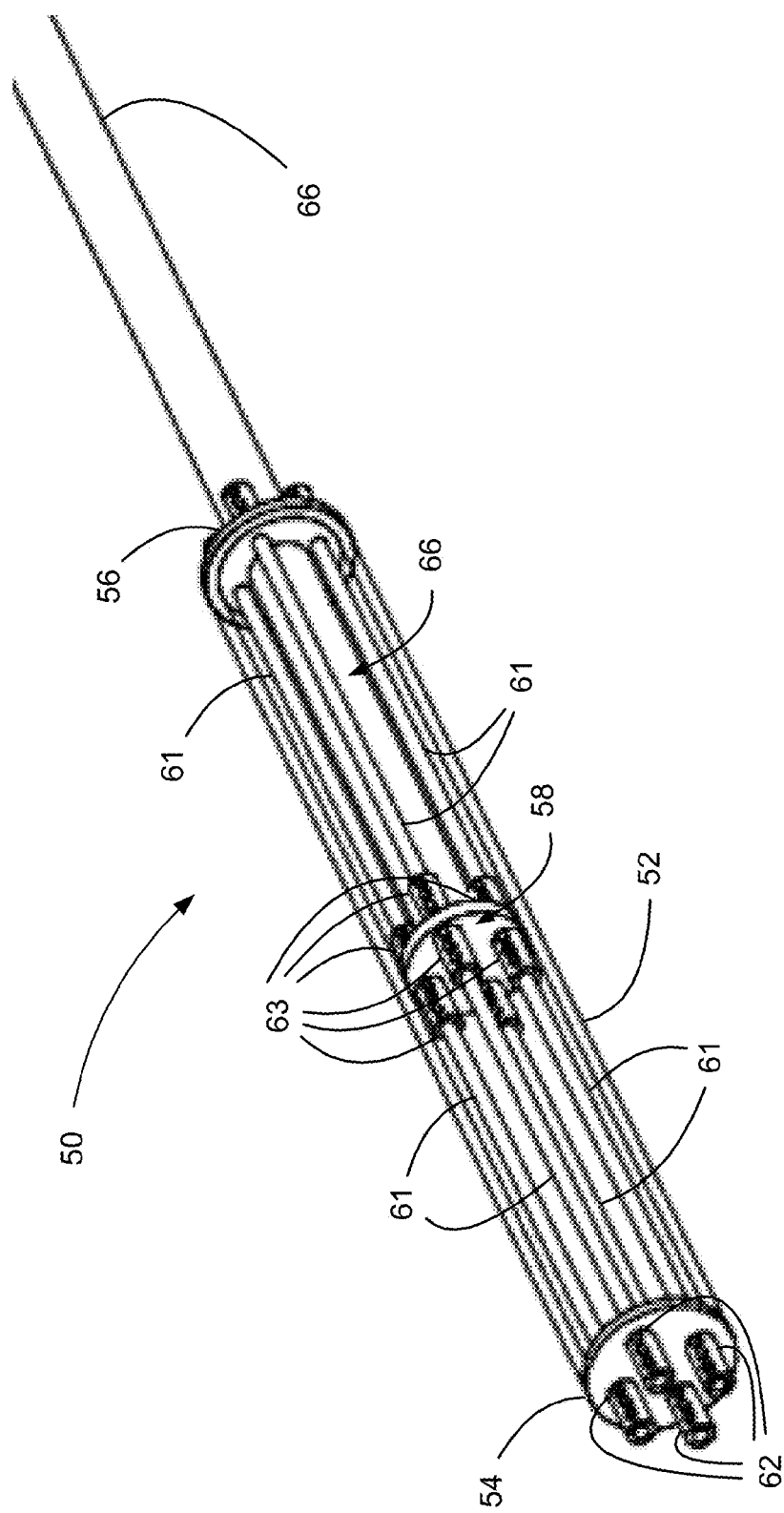
FIG. 3 is a perspective internal view of the exemplary piston-based self-centering brace apparatus shown in FIGS. 1 and 2.

One exemplary embodiment of a piston-based self-centering brace apparatus 50 disclosed herein is shown in FIGS. 1-3 and generally comprises a sleeve component 52 with a front cap 54 at its distal end and a back cap 56 at its proximal end. A piston component 66 slidingly communicates with the sleeve component 52 through the back cap 56. A piston plate 58 is integrally engaged with the distal end of the piston component 66 for slidable communication with the inner surface of the sleeve component 52. At least two equidistantly spaced-apart tie rods 61 are housed within the sleeve component 52 with the opposite ends of each tie rod extending through the front cap 54 and the back cap 56. Each end of each tie rod 61 is securely engaged by a wedge lock 62. If so desired, the wedge locks 62 may be substituted for with couplers or nuts (not shown). The piston plate 58 is provided equidistantly spaced-apart orifices (not shown) for receiving therethrough the tie rods 61. A pair of wedge locks 62 is fixed to a tie rod 61 on the opposite sides of an orifice provided therefore in the piston plate 58. It is to be noted that although the exemplary piston-based self-centering brace apparatus 50 in FIGS. 1-3 is shown with four tie rods 61, it is within the scope of this disclosure for the sleeve component 52 to additionally comprise one or more additional tie rods to provide additional resistance to vibrational energy and recentering capacity based on the requirements calculated for restraining potential tension and compression forces and to dissipate energies that may be encountered by a support infrastructure during a seismic event. For example, this embodiment of the exemplary piston-based self-centering brace apparatus may comprise four tie rods 61, five tie rods 61, six tie rods 61, seven tie rods 61, eight tie rods 61, nine tie rods 61, ten tie rods 61, twelve tie rods 61, fourteen tie rods 61, sixteen tie rods 61, eighteen tie rods 61, twenty tie rods 61, and more if so desired. It is optional if so desired, to substitute the tie rods with cables or multiple wires.

It is optional, if so desired, to partially or alternatively to completely fill the inner cavity of sleeve 52 between the piston plate 58 and the front cap 54 and/or the inner cavity of the sleeve between the back cap 56 and the piston plate 58 with a high-dampening filler material 64 exemplified by rubbers, polymeric elastomers, and the like. A hinged connector 68 engaged with the front cap 54, is mountable to a first structural component used for constructing a support infrastructure. A hinged connector (not shown) engaged with the proximal end (not shown) of the piston component 66 is mountable to a second structural component approximate its engagement point with the first structural components.

The wedge couplers 63 should only transfer forces to the ties rods 61 when the tie rods are under tensile loading. The joints between tie rods 61 and the piston plate 58, back cap 56, and front cap 54, should allow rotational movement without any bending moment generation. This will ensure that straightness of the tie rods is maintained in the event of any force-related deformation that may occur in the piston plate 58, back cap 56 and/or the front cap 54. The piston plate 58 should be made slightly smaller in size than the inner dimension of cylinder sleeve 52 so that deformation or rotation of the piston plate 58 during loading does not affect the structural integrity of cylinder sleeve 52.

Figure 4:
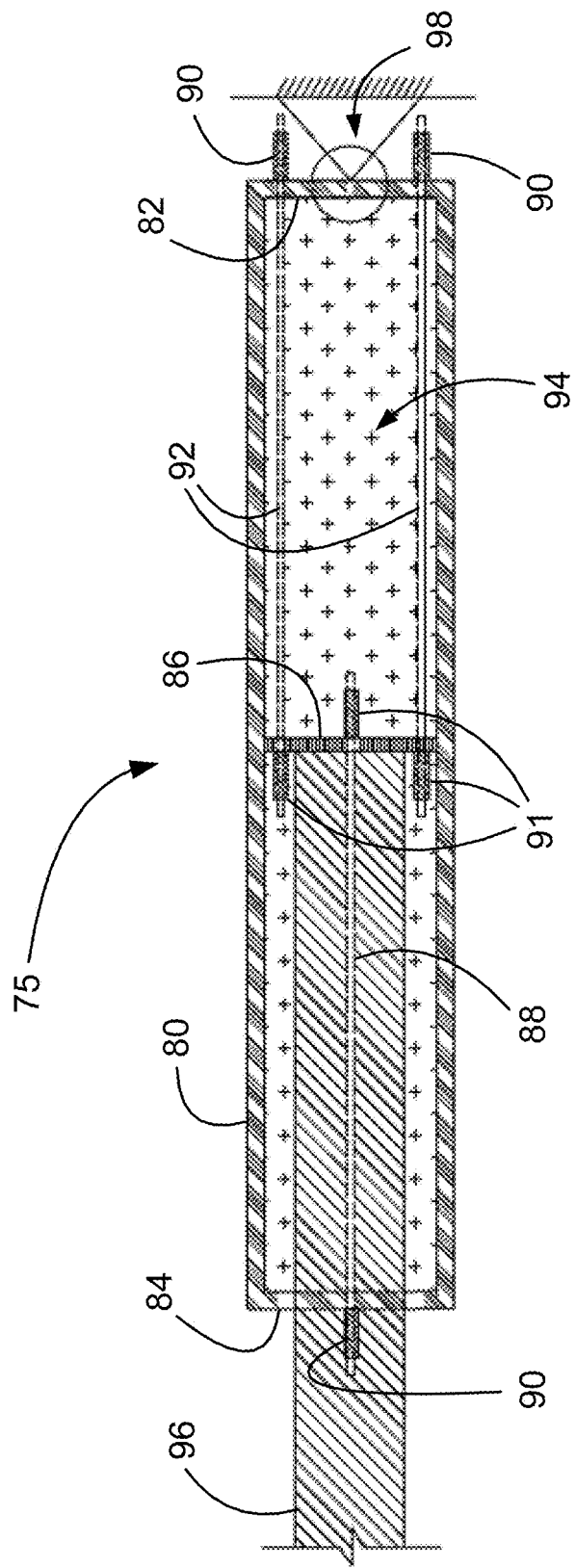
FIG. 4 is a cross-sectional view of another exemplary embodiment of a piston-based self-centering brace apparatus disclosed herein.
Figure 5:
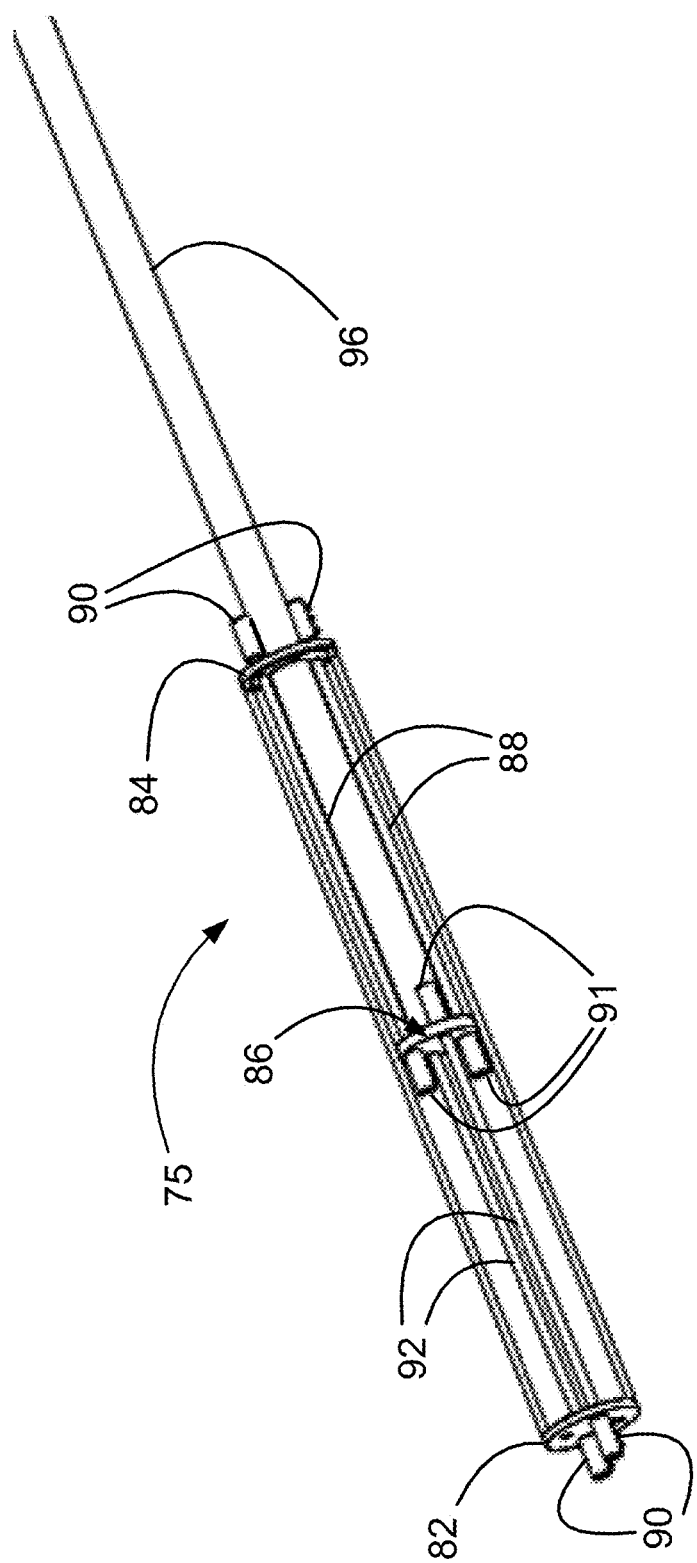
FIG. 5 is a perspective internal illustration of the piston-based self-centering brace apparatus shown in FIG. 4.

Another exemplary embodiment of a piston-based self-centering brace apparatus 75 disclosed herein is shown in FIGS. 4-5 and generally comprises a sleeve component 80 with a front cap 82 at its distal end and a back cap 84 at its proximal end.

A piston component 96 slidingly communicates with the sleeve component 80 through the back cap 84. A piston plate 86 is integrally engaged with the distal end of the piston component 96 for slidable communication with the inner surface of the sleeve component 80.

At least two equidistantly spaced-apart tie rods 88 are housed within the sleeve component 80 with one end of each tie rod 88 extending through the back cap 84 and its other end extending through the piston plate 86. A wedge lock 90 is securely engaged with the end of a tie rod 88 extending out from the back cap 84, and a wedge lock 91 is engaged with the other end of the tie rod 88 that extends through the piston plate 86. At least two equidistantly spaced-apart tie rods 92 are housed within the sleeve component with one end of each tie rod 92 extending through the front cap 82 and its other end extending through the piston plate 86. A wedge lock 90 is securely engaged with each end of each tie rod 92.

A wedge lock 90 is securely engaged with the end of a tie rod 92 extending out from the front cap 82, and a wedge lock 91 is engaged with the other end of the tie rod 92 that extends through the piston plate 86. If so desired, the wedge locks 90, 91 may be substituted for with couplers or nuts (not shown). Orifices (not shown) for receiving therethrough tie rods 88 and tie rods 92 are spaced equidistantly around the piston plate to allow slidable movement of a tie rod 88 or 92 therethrough. It is to be noted that although the exemplary piston-based self-centering brace apparatus 75 in FIG. 2 is shown with a pair of equidistantly spaced-apart back tie rods 88 and a pair of equidistantly spaced-apart front tie rods 92, it is within the scope of this disclosure to additionally add one or more pairs of additional tie rods 88, 92 to provide additional bracing stability and resiliency based on the requirements calculated for restraining potential tension and compression energies that may be encountered by a support infrastructure during a seismic event or another type of vibrational event. For example, this embodiment of an exemplary piston-based self-centering brace apparatus may comprise three tie rods 88 and 92, four tie rods 88 and 92, five tie rods 88 and 92, six tie rods 88 and 92, seven tie rods 88 and 92, eight tie rods 88 and 92, nine tie rods 88 and 92, ten tie rods 88 and 92, twelve tie rods 88 and 92, fourteen tie rods 88 and 92, sixteen tie rods 88 and 92, eighteen tie rods 88 and 92, twenty tie rods 88 and 92, and more if so desired. It may be suitable for some applications to have more tie rods 88 than tie rods 92. In other applications, it may be suitable to have more tie rods 92 than tie rods 88. It is optional if so desired, to substitute the tie rods with cables or multiple wires. It is optional, if so desired, to partially, or alternatively to completely fill the inner cavity of the sleeve 80 between the piston plate 86 and the front cap 84 and/or the inner cavity of the sleeve between the back cap 84 and the piston plate 86 with a high-damping filler material 94 exemplified by rubbers, polymeric elastomers, and the like. A hinged connector 98 engaged with the front cap 82 is mountable to a first structural component used for constructing a support infrastructure. A hinged connector (not shown) engaged with the proximal end (not shown) of the piston component 96 is mountable to a second structural component approximate its engagement point with the first structural component.

The wedge locks 90 fixed to the ends of the tie rods 88, 92 extending out from the front caps and back caps, from fully entering the sleeve 80 during tension or compression loading, while the wedge locks 91 fixed to the ends of the tie rods 88, 92 extending through the orifices in the piston plate 86 permit the tie rods 88, 92 elongate while the piston plate 86 moves back and forth. It is to be noted that wedge locks 91 will only transfer forces to the tie rods 88, 92 under tensile loading. The joints between tie rods 88 and the back cap 84, and tie rods 92 and front cap 82, should allow rotational movement without any bending moment generation. This will ensure that straightness of the tie rods 88, 92 is maintained in the event of any kind of deformations occurring in the end cap 84 and/or the front cap 82. The piston plate 86 should be made slightly smaller in size than the inner dimension of sleeve 80 so that deformation or rotation of the piston plate 86 during loading does not affect the structural integrity of sleeve 80.

In order to reduce gap between the perimeter surface of piston plate 58, 86 and the inner surface of the sleeve 52, 80, the perimeter surface of piston plate 58, 86 can be covered with thin compressible slippery material exemplified by TEFLON® (TEFLON is a registered trademark of the E.I. du Pont de Nemours and Co. Corp., Wilmington, Del., USA) and the like. The tie rods 61, 88, 92 should be designed for withstanding loads that are less than the buckling and yield strength of the piston 66, 96 and the yield strength of the sleeve 52, 80. When the piston-based self-centering brace apparatus 50, 75 is under compression and the load reaches the yield load of the tie rods 61, 88, the tie rods 61, 88 will yield and deform significantly thus lowering the axial stiffness of the piston-based self-centering brace apparatus 50, 75. This will in turn limit the axial force of the piston-based self-centering brace apparatus 50, 75 and keep it below the buckling capacity of the piston 66, 96. Suitable tie rods 61, 88, 92 are bars comprising a superelastic shape memory alloy (SMA) exemplified by metal alloys of nickel and titanium commonly referred to as nitinol, and alloys or combinations of tie rods comprising low-strength steel in parallel to ties made of materials with high-strength low-modulus of elasticity such as those exemplified by glass fiber-reinforced polymers, carbon fiber-reinforced polymers, and the like. SMA bars are known for their unique property of deforming under load application and then returning to their original undeformed shape upon removal of the load. Use of tie rods comprising SMA bars will facilitate a full self centering capability for the piston-based self-centering brace apparatus disclosed herein. Other suitable SMA materials are exemplified by copper-zinc alloys, copper-zinc-aluminum alloys, copper-aluminum-nickel alloys, iron-manganese alloys, manganese-copper alloys, iron-palladium alloys, titanium-nickel-copper alloys, and the like. On the other hand, use of parallel arrangements of tie rods comprising a high-strength low-modulus material and tie rods comprising low-strength steel or alloys or the like will provide partial self-centering capability to the piston-based self-centering brace apparatus of the present disclosure. In these types of configurations, the tie rods have to be supported at short intervals using plates similar to piston plate 58, 86. For supporting tie rods between the front cap 54, 82 and piston plate 58, 86, the plates will be similar to piston plates 58, 86. However, plates for supporting ties between back cap 56, 84 and piston plate 58, 86 the plates have to have an orifice similar to back cap 56, 84 to allow sliding communication with the piston component 66, 96.

The piston component is preferably an elongate cylindrical rod or bar with a circular cross-section and may comprise a solid material or alternatively a tubular material. It is also suitable for the piston component to have an elliptical cross-section. Alternatively, the piston component may be an elongate solid bar or tubular bar having flat sides with equal widths or optionally, unequal widths. For example three sides, four sides, five sides, six sides, seven sides, eight sides, nine sides, ten sides, eleven sides, twelve sides, or more. It is to be noted that the back cap component that engages one end of the sleeve component is provided with an orifice with edges that match the external contours of the piston component, for slidingly receiving therethrough the piston component.

It is within the scope of the present disclosure for the piston component to comprise two elongate rods or bars coupled together end-to-end, with a suitable coupling device. One of the two elongate bars may comprise a high-modulus low-strength material while the other elongate bar may comprise a low-modulus high-strength material. Alternatively, both of the elongate bars may comprise a high-modulus low-strength material. Alternatively, both of the elongate bars may comprise a low-modulus high-strength material. It is optional for the piston component to comprise three or more elongate rods or bars coupled together end-to-end, with a suitable coupling device. One or more of the elongate bars may comprise a high-modulus low-strength material while the others may comprise a low-modulus high-strength material. Alternatively, all of the elongate bars may comprise a high-modulus low-strength material. Alternatively, all of the elongate bars may comprise a low-modulus high-strength material.

The tie bars housed within the cylindrical sleeve component are preferably elongate cylindrical rods or bars with circular cross-sections. However, it is also suitable for the tie rods to have an elliptical cross-section. Alternatively, the tie rods may be elongate solid bars or hollow bars with flat sides of equal widths or alternatively unequal widths. For example three sides, four sides, five sides, six sides, seven sides, eight sides, nine sides, ten sides, eleven sides, twelve sides, or more. It is optional for wires or cables or strands to be substituted for the tie rods. It should be noted that the orifices in the front caps, back caps and piston plates should be sized to facilite non-binding movement of the tie rods therethrough. The tie rods are secured against the plates with the wedge locks or alternatively, with couplers or nuts or the like.

In exemplary piston-based self-centering brace apparatus wherein the high-strength low-modulus tie rods are used in parallel with low-strength tie rods, the hysteretic energy will come from low-strength material partially completing its hysteretic loops. In order to achieve this hysteresis under compression loading, the low-strength tie rods should be supported at intermediate points by one or more additional piston plates interposed the piston plate integrally engaged with the distal end of the piston component and the front cap of the sleeve to prevent buckling due to compressive load generated by the high strength alloy/composite materials. TEFLON® coating or grease may be used inside the sleeve if reduction of friction is needed.

Conversely, if more damping is needed for the design of the structure in which the brace is going to be installed, TEFLON® coating/grease should not be used as friction between the tie rods and the piston plates and/or back caps and/or front caps can be used as an alternate damping mechanism.

It is to be understood that during installation of the piston-based self-centering brace apparatus in a support infrastructure, a compressive force should be applied prior to securely engaging the wedge/locks to the tie rods extending through the front caps of the sleeve to ensure a tight fitting of the tie rods. This will prevent the initial sliding of the piston component with brace under tensile loading.

During tensile loading, the piston will pull the front tie rods thereby completing a load path through the piston to the trout tie rod to the front cap combination. During the tension phase, the back tie rods will get disconnected from the cylinder/sleeve back cap (FIG. 1) and/or from the piston plate (FIG. 4) and back tie rods will be able to freely move in or out of the sleeve by approximately the amount of tensile deformation experienced by the front ties. Therefore, the back tie rods will not participate in load transfer during tensile loading.

During compressive loading, the piston plate will pull the back tie rods thereby locking the back ties with the back cap of the sleeve thereby thus transferring the load to the sleeve as a compressive force. Accordingly, the load path under compression force is piston to the back tie rods to the back cap to the cylinder/sleeve to the support infrastructure During the compression phase, the front tie rods will get disconnected from the sleeve front cap (FIG. 1) and/or the piston plate (FIG. 4) and they will freely move in or out of the sleeve by approximately the amount of tensile deformation experienced by the back ties rod. This mechanism ensures that the front tie rods will never participate during the compressive loading phase. The connection between the tie rods and the sleeve end caps should be made in a way that they only lock during inward movement of the tie rods but can move freely through the orifices when tie rod movement is outward. The main purpose for this mechanism is that the tie rods should never take compressive load in order to prevent buckling. The connection of the piston-based self-centering brace apparatus with a structural member should be a hinge type so that only axial loads are transferred from the structural member to the piston-based self-centering brace apparatus.

Figure 6:
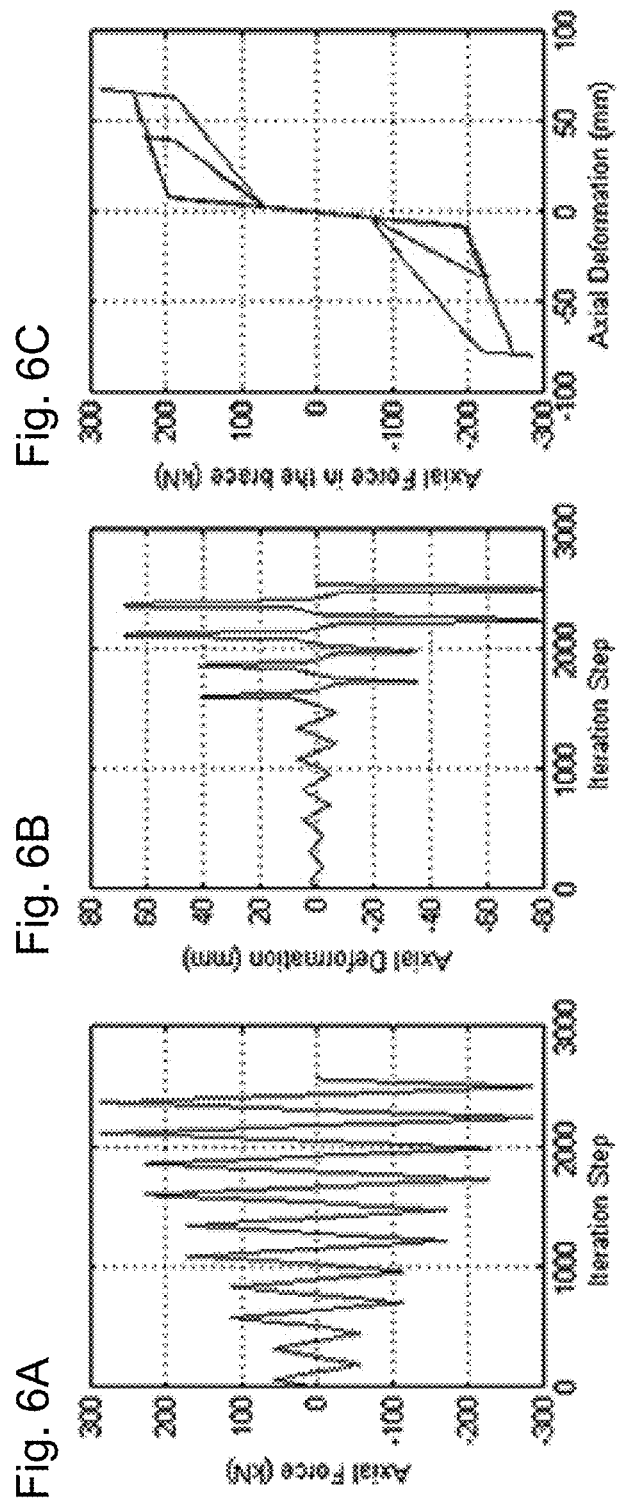
FIGS. 6(A)-6(C) are charts illustrating quasi-static analyses of the response of an exemplary piston-based self-centering brace apparatus to repeated applications of tension and compression forces.

An exemplary 5-m long piston-based self-centering brace apparatus similar to the embodiment shown in FIGS. 4-5, was modeled using finite element code and its stability and deformation characteristics under quasi-static cyclic loading were assessed using the methods taught by Black et al. (2004, *Component testing, seismic evaluation and characteristics of buckling-restrained braces*. J. Struct. Eng. 130 (6):880-894). The piston component was 4 m long and included with a coupled HA102x8 section. The brace apparatus comprised two pairs of 1-m long front SMA tie rods and two pairs of 1-m long back SMA tie rods. The diameter of each SMA tie rod was 12.7 mm. The stress testing on the model was analyzed with a MATLAB®-based nonlinear finite element program (MATLAB is a registered trademark of Mathworks Inc., Natick, Mass., USA) incorporating a SMA hysteresis model and a bilinear steel hysteresis model for accurate nonlinear force and deformation calculations. The testing included 2,500 steps of progressively increasing/decreasing tension and compression forces applied to the brace apparatus (FIG. 6(A)). The data shown in FIGS. 6(B) and 6(C) demonstate that below 60 mm deformation (6% axial deformation of the ties) the system is fully self-centering but beyond 60 mm deformation (6%), the SMA tie rods became fully martensite and their stress-carrying capacity increased dramatically suggesting that the higher cyclical tension/compression forces resulted in very high compressive force in the brace that could result in buckling. Buckling can be prevented by increasing the length of the tie rods as required for specific applications. It should be noted that for most building infrastructature applications, the exemplary piston-based self-centering brace apparatus will be installed in inclined positions. In such installations, any deformations experienced by the braces will translate into about twice the deformation experienced by the structural components in a horizontal direction. Frame instructures for buildings are typically designed to limit their interstory drift values below 2.5%. For a structure having a 3-m floor-ceiling height, the maximum allowable inter-story drift will be 75 mm which translates to brace elongation/compression of about 35 mm to 40 mm. Accordingly, the 60-mm deformation capacity achieved from 1-m long ties in the above-noted testing, should be adequate for most types of building structures. This 60-mm brace deformation is almost equivalent to 120 mm horizontal frame deformation or about 4% interstory drift. The above-mentioned analysis assumed no slippage occurred between the couplers and the piston components. Also, piston plate or end plate deformation and their subsequent effect on the bars were not taken into consideration.

Figure 7:
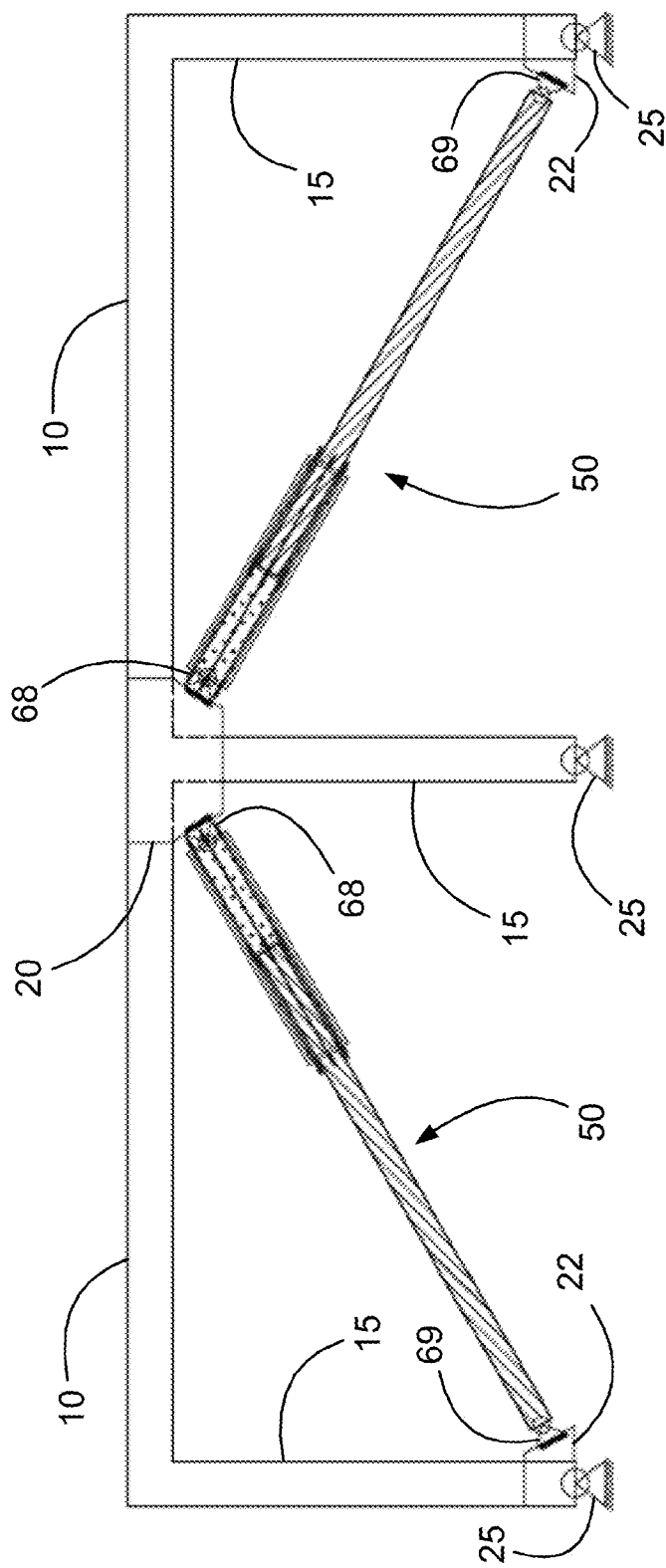
FIG. 7 is a schematic illustration of a chevron/V/X configuration for a building structural support infrastructure incorporating a pair of the exemplary piston-based self-centering brace apparatus disclosed herein.
Figure 8:
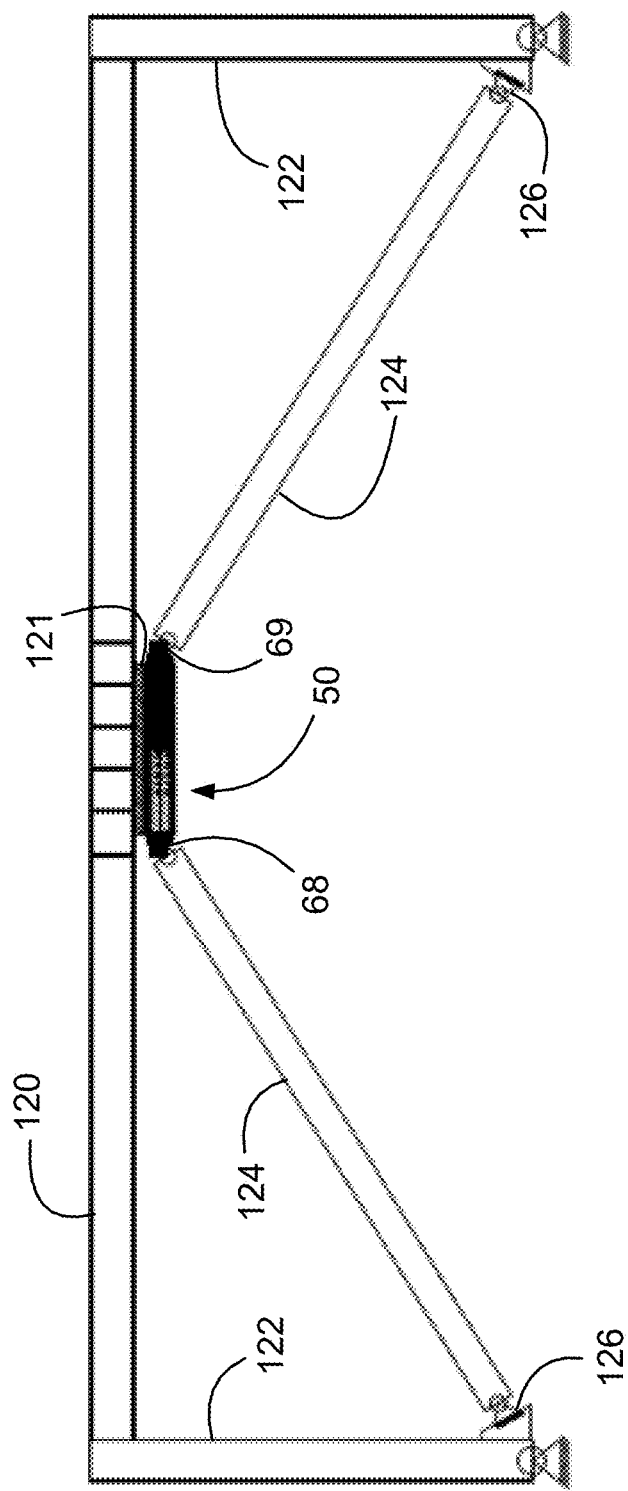
FIG. 8 is a schematic illustration of an exemplary piston-based self-centering brace apparatus fitted to a horizontal supporting beam, wherein each end of the self-centering brace apparatus is engaged with one end of a bracing member whose opposite end is engaged with a vertical column supporting the horizontal beam.
Figure 9:
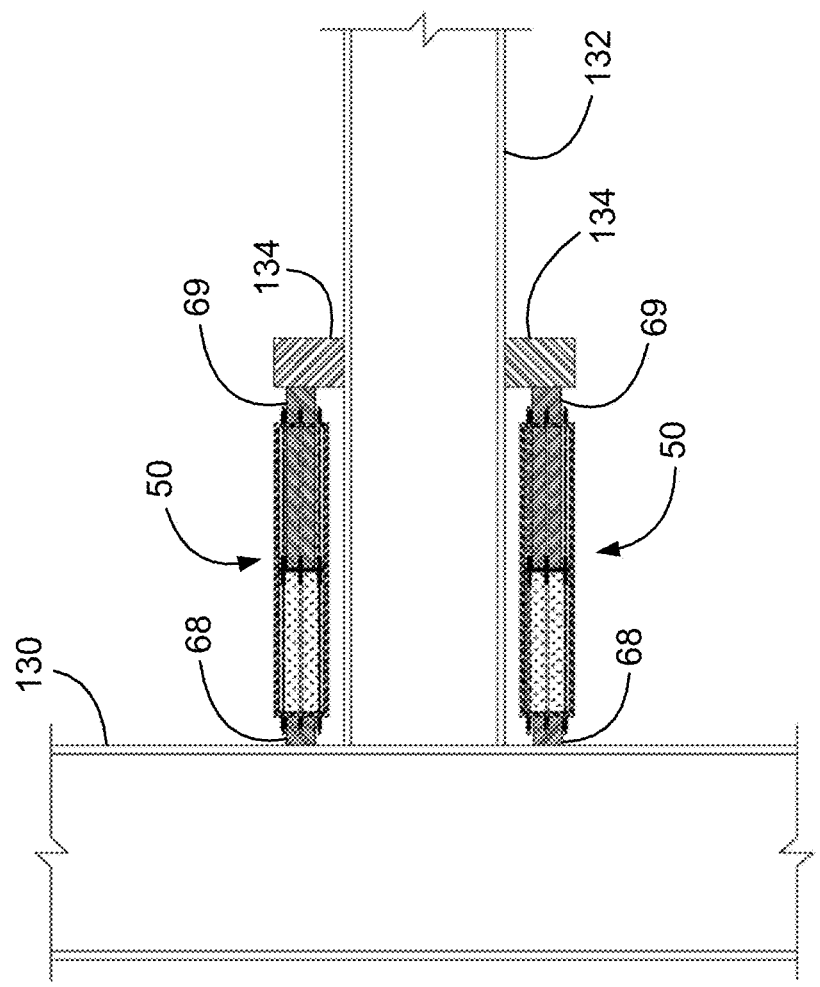
FIG. 9 is a schematic illustration of a joint of a horizontal beam with a vertical column wherein a first exemplary piston-based self-centering brace apparatus is fitted to the top of the horizontal beam at one end and engaged with the column at its other end, and a second exemplary piston-based self-centering brace apparatus is fitted to the bottom of the horizontal beam at one end and engaged with the column at its other end.

The exemplary piston-based self-centering brace apparatus disclosed herein are suitable for incorporation as bracing systems into building infrastructures as shown in FIGS. 7-9. For example, as shown in FIG. 7, a building infrastructure comprising horizontal beams 10 that are engaged with vertical columns 15, a pair of opposing piston-based self-centering brace apparatus 50 can be engaged at one end of their ends 68 with a gusset 20 that is fixed to the beam 10 and first column 15, and at their other ends 69 to gussets fixed to a second column 15 and a third column 15 in a chevron/V/X arrangement. Such chevron/V/X arrangements can be incorporated into a support superstructure design as required or desired. Alternatively, as shown in FIG. 8, a piston-based self-centering brace apparatus 50 may be mounted to a horizontal beam 120 with a bracket 121 engaging at least the cylindrical sleeve component, one end of the brace apparatus engaged with a gusset 126 on one end of a first truss 124 that is engaged by a gusset 126 with a first vertical column 122 interconnecting with the horizontal beam 120. The other end 69 of the brace apparatus 50 is engaged with gusset 126 on one end of a second truss 124 that is engaged by a gusset 126 with a second vertical column 122 interconnecting with the horizontal beam 120. The arrangement shown in FIG. 8 will function to resist shear forces that may occur during a vibrational event. Another design for use of the exemplary piston-based self-centering brace apparatus 50 disclosed herein, is shown in FIG. 9 for absorbing vibrational energy generated at T-junctions (beam-column joints) between horizontal beams 132 and vertical columns 130 wherein a first brace apparatus 50 is mounted above a horizontal beam 132 by engagement of its end 69 to a bracket 134 securely fixed to the beam 132, and by engagement of its end 68 with a mount provided therefore on a vertical column 130. A second brace apparatus 50 is mounted above a horizontal beam 132 by engagement of its end 69 to a bracket 134 securely fixed to the beam 132, and by engagement of its end 68 with a mount provided therefore on a vertical column 130. It is to be noted that the brace apparatus 50 may be substituted for as desired by the exemplary brace apparatus illustrated in FIGS. 4-5.

Figure 10:
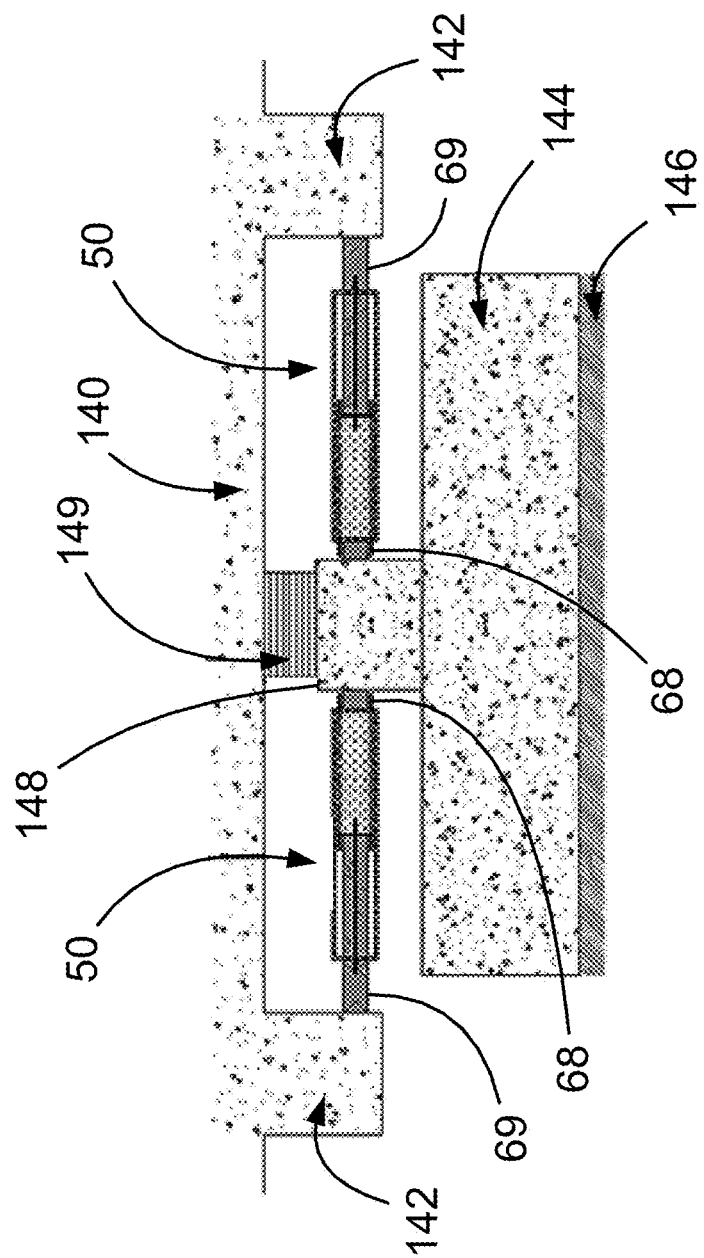
FIG. 10 is a schematic illustration of a base isolation foundation support configuration for a superstructure that incorporates a plurality of the piston-based self-centering brace apparatus to facilitate the base isolation foundation support configuration to restore the superstructure to its original position after a seismic event.

The exemplary piston-based self-centering brace apparatus disclosed herein are also suitable for recentering isolation systems used in building foundations. For example, as shown in FIG. 10, a concrete foundation 144 poured above a compacted excavated substructure 146 may be provided with a plurality of piers 148. The superstructure rising above the foundation may comprise a plurality of girders 142 for supporting a prefabricated or alternatively, a poured concrete slab 140. Opposing pairs of piston-based self-centering brace apparatus 50 are engaged by their ends 28 on opposite sides of a pier 148. The other end 69 of one of the brace apparatus 50 is engaged to a side of a first girder 142, while the other end 69 of the other brace apparatus 50 is engaged to a side of a second girder 142. A base isolator 149 is interposed the top of the pier 148 and the bottom surface of the concrete slab.

Figure 11:
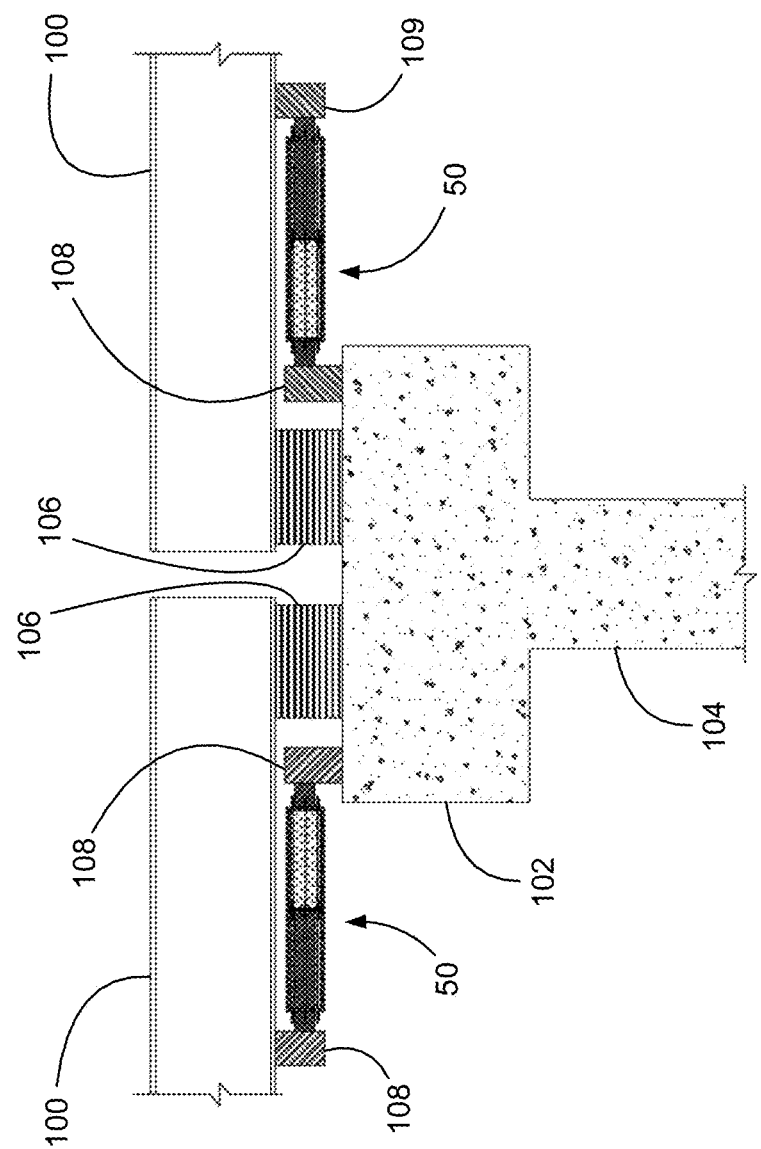
FIG. 11 is a schematic illustration of a configuration for a bridge restraining support infrastructure wherein an exemplary piston-based self-centering brace apparatus is used for recentering engagement of a bridge girder with a supporting pier.
Figure 12:
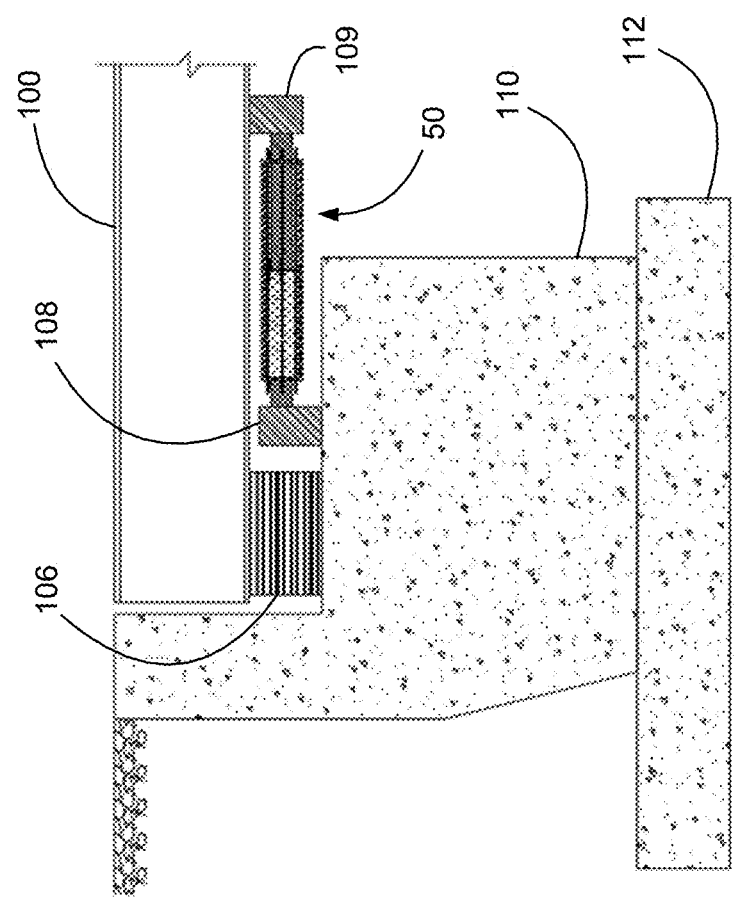
FIG. 12 is a schematic illustration of a configuration for a bridge restraining support infrastructure wherein an exemplary piston-based self-centering brace apparatus is used for recentering engagement of a bridge girder with a girder-supporting abutment.

The exemplary piston-based self-centering brace apparatus disclosed herein are also suitable for isolating bridge girders from the supporting base structures of the bridge. For example, as shown in FIG. 11, a pier 102 (or alternatively, a pier cap or a bent beam) capping a vertical bridge support infrastructure, is provided with a pair of spaced-apart brackets 108, wherein each bracket is configured to pivotably engaging one end of a brace apparatus 50. A bridge girder 100 is provided with a bracket 109 approximate the end of the girder for pivotably engaging the other end of the brace apparatus 50. A dampening material 106 is interposed the top of the pier 102 and the bottom surface of the girder approximate its end. The exemplary piston-based self-centering brace apparatus may also be used to recenter bridge isolation systems as exemplified in FIG. 12 wherein a bracket 108 for pivotably engaging one end of a brace apparatus 50, is engaged with the top surface of a bridge abutment 110 arising from a bridge footing 112. A bridge girder 100 is provided with a bracket 109 approximate the end of the girder 100 for pivotably engaging the other end of the brace apparatus 50. An isolation system 106 is interposed the top of the abutment 110 and the bottom surface of the girder 100 approximate its end.

It is to be noted that while reference has been made in the preceding examples to piston-based self-centering brace apparatus exemplified in FIGS. 1-3, it is suitable to alternatively use the piston-based self-centering brace apparatus exemplified in FIGS. 4-5. It is also to be noted that the exemplary piston-based self-centering brace apparatus disclosed herein can be incorporated into the design and construction of new structural support infrastructures for buildings, bridges, aqueducts, and the like. The exemplary piston-based self-centering brace apparatus can also be used to replace other types of bracing systems previously incorporated into structural support infrastructures.

The invention claimed is:

1. A brace apparatus for mounting between two structural components of a support infrastructure resist tension forces and compression forces imposed on the support infrastructure, the brace apparatus comprising:
    an elongate piston component having a distal end and a proximal end, said distal end engaged with a piston plate and said proximal end configured to cooperate with a hinged component for demountable engagement with a first structural component;
    a sleeve component for receiving the piston component therein and communicating therewith the piston plate, the sleeve component having a back cap for receiving the piston component therethrough and a front cap configured to cooperate with a hinged component for demountable engagement with a second structural component; and
    a plurality of equidistantly spaced-apart tie rods housed within the sleeve component wherein one end of each tie rod extends through an orifice provided therefore in the front can and is secured thereto and the other end of the tie rod extends through an orifice provided therefore in the back cap and is secured thereto, said tie rod slidingly inserted through an orifice provided therefore in the piston plate.

2. A brace apparatus for mounting between two structural components of a support infrastructure to resist tension forces and compression forces imposed on the support infrastructure, the brace apparatus comprising:
    an elongate piston component having a distal end and a proximal end, said distal end engaged with a piston plate and said proximal end configured to cooperate with a hinged component for demountable engagement with a first structural component;
    a sleeve component for receiving the piston component therein and communicating therewith the piston plate, the sleeve component having a back cap for receiving the piston component therethrough and a front cap configured to cooperate with a hinged component for demountable engagement with a second structural component;
    a first plurality of equidistantly spaced-apart tie rods housed within the sleeve component wherein one end of each tie rod extends through an orifice provided therefore in the front cap and is secured thereto and the other end of the tie rod is slidingly inserted through an orifice provided therefore in the piston plate; and
    a second plurality of equidistantly spaced-apart tie rods housed within the sleeve component wherein one end of each tie rod extends through an orifice provided therefore in the back cap and is secured thereto and the other end of the tie rod is slidingly inserted through an orifice provided therefore in the piston plate.

3. A brace apparatus according to claim 1 or 2, wherein the piston component is one of a cylindrical rod or a flat-sided rod.

4. A brace apparatus according to claim 3, wherein the cylindrical rod has a circular cross-section or an elliptical cross-section.

5. A brace apparatus according to claim 3, wherein the flat-sided rod has a plurality of sides.

6. A brace apparatus according to claim 3, wherein the flat-sided rod has one of three sides, four sides, five sides, six sides, seven sides, eight sides, nine sides, ten sides, eleven sides, or twelve sides.

7. A brace apparatus according to claim 1, wherein the piston component comprises a superelastic shape memory alloy.

8. A brace apparatus according to claim 7, wherein the super elastic shape memory alloy is one of a nickel-titanium alloy, a copper-zinc alloy, a copper-zinc-aluminum alloy, copper-aluminum-nickel alloy, an iron-manganese alloy, a manganese-copper alloy, an iron-palladium alloy, or a titanium-nickel-copper alloy.

9. A brace apparatus according to claim 1, wherein the piston component comprises two components coupled together wherein one of the components comprises a super elastic shape memory alloy and the other component comprises a low-strength metal.

10. A brace apparatus according to claim 9, wherein the super elastic shape memory alloy component is engaged with the piston plate.

11. A brace apparatus according to claim 9, wherein the low-strength metal component is engaged with the piston plate.

12. A brace apparatus according to claim 1, wherein each of the plurality of tie rods is one of a cylindrical rod or a flat-sided rod.

13. A brace apparatus according to claim 12, wherein the cylindrical rod has a circular cross-section or an elliptical cross-section.

14. A brace apparatus according to claim 12, wherein the flat-sided rod has a plurality of sides.

15. A brace apparatus according to claim 12, wherein the flat-sided rod has one of three sides, four sides, five sides, six sides, seven sides, eight sides, nine sides, ten sides, eleven sides, or twelve sides.

16. A brace apparatus according to any of claims 12-14, wherein the tie rod comprises a super elastic shape memory alloy.

17. A brace apparatus according to claim 16, wherein the super elastic shape memory alloy is one of a nickel-titanium alloy, a copper-zinc alloy, a copper-zinc-aluminum alloy, copper-aluminum-nickel alloy, an iron-manganese alloy, a manganese-copper alloy, an iron-palladium alloy, or a titanium-nickel-copper alloy.

18. A brace apparatus according to claim 2, wherein each of the first plurality of tie rods and each of the second plurality of tie rods is one of a cylindrical rod or a flat-sided rod.

19. A brace apparatus according to claim 18, wherein the cylindrical rod has a circular cross-section or an elliptical cross-section.

20. A brace apparatus according to claim 18, wherein the flat-sided rod has a plurality of sides.

21. A brace apparatus according to claim 18, wherein the flat-sided rod has one of three sides, four sides, five sides, six sides, seven sides, eight sides, nine sides, ten sides, eleven sides, or twelve sides.

22. A brace apparatus according to any of claims 18-20, wherein the tie rod comprises a super elastic shape memory alloy.

23. A brace apparatus according to claim 22, wherein the super elastic shape memory alloy is one of a nickel-titanium alloy, a copper-zinc alloy, a copper-zinc-aluminum alloy, copper-aluminum-nickel alloy, an iron-manganese alloy, a manganese-copper alloy, an iron-palladium alloy, or a titanium-nickel-copper alloy.

24. A brace apparatus according to claim 1, additionally comprising a compressible material within the sleeve component, said compressible material interposed the piston plate and a front plate.

* * * * *